(12) United States Patent
Tomita

(10) Patent No.: US 7,583,438 B2
(45) Date of Patent: Sep. 1, 2009

(54) QUANTUM CIRCUIT AND QUANTUM COMPUTER

(75) Inventor: Akihisa Tomita, 4074-12, Ozone, Tsukuba-shi, Ibaraki (JP) 300-3253

(73) Assignees: Japan Science and Technology Agency, Kawaguchi-shi (JP); Akihisa Tomita, Tsukuba-shi (JP)

(*) Notice: Subject to any disclaimer, the term of this patent is extended or adjusted under 35 U.S.C. 154(b) by 491 days.

(21) Appl. No.: 10/526,047

(22) PCT Filed: Oct. 2, 2002

(86) PCT No.: PCT/JP02/10253

§ 371 (c)(1),
(2), (4) Date: Jul. 28, 2005

(87) PCT Pub. No.: WO2004/023232

PCT Pub. Date: Mar. 18, 2004

(65) Prior Publication Data

US 2006/0208311 A1    Sep. 21, 2006

(30) Foreign Application Priority Data

Aug. 30, 2002   (JP)   ............................. 2002-255649

(51) Int. Cl.
*G02B 5/30* (2006.01)

(52) U.S. Cl. ............... 359/485; 359/240; 359/246; 977/940

(58) Field of Classification Search ............... None
See application file for complete search history.

(56) References Cited

U.S. PATENT DOCUMENTS

2003/0123051 A1* 7/2003 McGrew ............... 356/72

FOREIGN PATENT DOCUMENTS

JP    11-346211    12/1999

* cited by examiner

*Primary Examiner*—Stephone B Allen
*Assistant Examiner*—Derek S Chapel
(74) *Attorney, Agent, or Firm*—Oblon, Spivak, McClelland, Maier & Neustadt, P.C.

(57) ABSTRACT

A quantum circuit and a quantum computer are capable of performing multi-bit quantum computation. In the quantum circuit, a quantum bit is represented by polarization directions of light, a sequence of polarized light pulses representing a quantum bit string is sequentially supplied to the quantum circuit, and an amount of polarization rotation and phase difference applied to a certain light pulse are determined on the basis of a result of a polarization measurement of a preceding input light pulse sequence, thus realizing a controlled-unitary transform. In addition, regarding the light pulses representing the quantum bits, the number of photons included in one pulse is larger than 1, resulting in a reduction of the influence of error.

5 Claims, 1 Drawing Sheet

QUANTUM CIRCUIT AND QUANTUM COMPUTER

TECHNICAL FIELD

The present invention relates to quantum circuits and quantum computers and, more particularly, to a quantum circuit and a quantum computer using a controlled-unitary transform.

BACKGROUND ART

In order to realize computational capacity extending beyond conventional computer limits, research on quantum computation has become active in recent years. For example, the use of the algorithm disclosed by P. W. Shor at the 35th Annual Symposium of the Foundations of Computer Science in 1995 achieves the factorization of a large integer into prime factors in time expressed by a polynomial indicating the number of bits.

In conventional computers, execution time increases as an exponential function of the number of bits. In the conventional computers, execution time proportional to the number of bits is required to retrieve an N-bit database. Using the algorithm proposed by L. Grover, Physical Review Letters, Vol. 79, p. 325, 1997, however, the database can be retrieved in time proportional to the square root of N.

The above quantum computation is realized using a fundamental unit called a quantum bit (qubit) substituting for a classical bit. The qubit is characterized by including a linear superposition of a state $|0\rangle$ corresponding to a logical value 0 and a state $|1\rangle$ corresponding to a logical value 1, i.e., $|\Psi\rangle=a|0\rangle+b|1\rangle (a^2+b^2=1)$. Further, quantum gates for performing a unitary transform of $|\Psi\rangle \rightarrow U|\Psi\rangle$ to one qubit, controlled-unitary transform gates for performing the unitary transform to another qubit depending on the state of the one qubit, and a quantum circuit composed of the above gates are needed.

The above-mentioned content will now be described using Shor's algorithm to resolve an integer N into prime factors as an example.

This algorithm is implemented using the combination of conventional computation (classical computation) and quantum computation.

1. When N is an even number, 2 is output as a factor.
2. Whether p and q satisfying conditions that $p \geq 1$, $q \geq 2$, and $N=p^q$ exist is determined by classical computation. If they exist, p is output as a factor.
3. Select an integer a (1<a<N) at random. The greatest common divisor of a and N is calculated using Euclidean algorithm. When the greatest common divisor is larger than 1, the greatest common divisor is output.
4. Order r of a modN is computed using a quantum computer for finding order.
5. When r is an odd number or an even number, which satisfies that $a^{r/2}=-1(\text{modN})$, the routine is returned to step 3. In other cases, the greatest common divisor of $a^{r/2}-1$ and N and the greatest common divisor of $a^{r/2}+1$ and N are computed. When these greatest common divisors are not self-evident factors (1 or N), they are output.

The quantum computer used in step 4 is realized by a quantum circuit shown in FIG. 1. In this case, the number of bits is 4. The quantum circuit shown in FIG. 1 includes a circuit 21 for applying a phase depending on order and an inverse Fourier transform circuit 22 for obtaining the order from the phase. A controlled-unitary transform gate $U_a$ 23 in the circuit 21 for applying the phase depending on the order is given by $$cU_a|0\rangle|x\rangle=|0\rangle|x\rangle,$$
$$cU_a|1\rangle|x\rangle=|1\rangle|ax \bmod N\rangle, \quad (1)$$

where c denotes a constant. In this circuit, a qubit is transformed as $$cU_a(|0\rangle+|1\rangle)|1\rangle = \sum_{j=0}^{r-1}\sum_{s=0}^{r-1} \exp[2^n \pi i s j/r]j\rangle|u_s\rangle, \quad (2)$$

where $|u_s\rangle$ is defined by $$|u_s\rangle = \frac{1}{\sqrt{r}}\sum_{k=0}^{r-1}\exp[-2\pi i s k/r]|a^k \bmod N\rangle. \quad (3)$$

When a first qubit is subjected to an inverse Fourier transform, the following expression is obtained.

$$\frac{1}{\sqrt{r}}|s/r\rangle|u_s\rangle \quad (4)$$

When the first qubit is measured, s/r is obtained, so that the estimate of r can be obtained. Each Hadamard gate 24 performs the transform expressed as $$|0\rangle \leftrightarrow \frac{1}{\sqrt{2}}(|0\rangle+|1\rangle) \quad (5)$$
$$|1\rangle \leftrightarrow \frac{1}{\sqrt{2}}(|0\rangle-|1\rangle).$$

In addition, the inverse Fourier transform uses controlled-rotation gates 25 each performing a kind of controlled-unitary transform. Each controlled-rotation gate 25 is given by $$R_k: \begin{cases} |0\rangle|0\rangle \rightarrow |0\rangle|0\rangle \\ |0\rangle|1\rangle \rightarrow |0\rangle|1\rangle \\ |1\rangle|0\rangle \rightarrow |1\rangle|0\rangle \\ |1\rangle|1\rangle \rightarrow \exp[2^{-k}\pi i]|1\rangle|1\rangle. \end{cases} \quad (6)$$

To realize Shor's algorithm, a nuclear magnetic resonance (NMR) technology using spin nuclei in an organic molecule as quantum bits has been utilized.

Recently, an experiment in factoring 15=3×5 into prime factors has been reported by L. M. K. Vandersypen, M. Steffen, G. Breyta, C. S. Yannonl, M. H. Sherwood, and I. L. Chuang, Nature, Vol. 414, p. 883, 2001.

DISCLOSURE OF INVENTION

In the above-mentioned conventional system, however, in principle, it is difficult to realize computation with 10 qubits or more and it is impossible to implement practically meaningful computation. Studies on the reduction of the number of qubits necessary for quantum computation have been conducted. According to a report by S. Beauregard, Los Alamos Preprint Archive, quant-ph/0205095 (2002), the number of qubits necessary for the factorization of an n-bit integer into prime factors can be reduced to 2n+3. In this case, to factorize, e.g., a 40-bit integer into prime factors, 83 bits are required. Accordingly, it is difficult to implement computation by a method using spin nuclei in an organic molecule as qubits.

Even using other methods for realizing computation with qubits, qubits lose coherence due to the influence of an environment. Thus, it is difficult to perform multi-bit quantum computation.

In consideration of the above circumstances, an object of the present invention is to provide a quantum circuit and a quantum computer capable of performing multi-bit quantum computation.

To accomplish the above object, the present invention provides:

[1] A quantum circuit in which a quantum bit is represented by the polarization directions of light, a sequence of polarized light pulses indicating a quantum bit string is sequentially supplied, and the amount of polarization rotation on a certain light pulse and the amount of phase difference are determined on the basis of a result of the measurement of the preceding input light pulse sequence, thus realizing a controlled-unitary transform.

[2] The quantum circuit according to the above [1], characterized in that the controlled-unitary transform causes the phase difference between polarization indicating a |0> state and polarization indicating a |1> state.

[3] The quantum circuit according to the above [2], characterized in that outputs of a polarization beam splitter are coupled through a polarization maintaining fiber, and a phase modulator is arranged in a position deviated from the middle point of the polarization maintaining fiber, thus causing the phase difference between the polarization indicating the |0> state and that indicating the |1> state.

[4] The quantum circuit according to the above [1], [2], or [3], characterized in that in the light pulses representing the quantum bits, the number of photons included in one pulse is larger than 1.

[5] A quantum computer including the quantum circuit according to the above [1], [2], [3], or [4].

The quantum circuit according to the present invention is characterized in that a quantum bit is represented by the polarization directions of light, a sequence of polarized light pulses indicating a quantum bit string is sequentially supplied, and the amount of polarization rotation on a certain light pulse and the amount of phase difference are determined on the basis of a result of the measurement of the preceding input light pulse sequence, thus realizing a controlled-unitary transform.

In the quantum circuit, the controlled-unitary transform is realized by measuring the state of a control quantum bit and supplying a result of the measurement as an electric signal to a modulator. Thus, computation for multiple quantum bits can be sequentially performed.

Advantageously, therefore, an arbitrary number of quantum bits can be transformed by the controlled-unitary transform for one quantum bit.

In the quantum circuit according to the present invention characterized in that the controlled-unitary transform causes the phase difference between polarization indicating a |0> state and polarization indicating a |1> state, outputs of a polarization beam splitter are coupled through a polarization maintaining fiber, and a phase modulator is arranged in a position deviated from the middle point of the polarization maintaining fiber, thus causing the phase difference between the polarization indicating the |0> state and that indicating the |1> state, polarized light in the |0> state and polarized light in the |1> state propagate through the same fiber. Thus, it is possible to prevent a reduction in coherence caused by fluctuations in the index of refraction in the fiber.

Further, in the quantum circuit of the present invention, the number of photons included in each of light pulses representing quantum bits can be larger than 1. Consequently, even when a large error is included in the input state or the unitary transform, an error in the measurement result can be reduced.

Therefore, in the quantum computer including the quantum circuit of the present invention, advantageously, the accuracy of the quantum circuit at the preceding stage is not strongly demanded, so that multi-bit computation can be easily performed.

BEST MODE FOR CARRYING OUT THE INVENTION

An embodiment of the present invention will now be described below with reference to the drawings.

Figure 2:
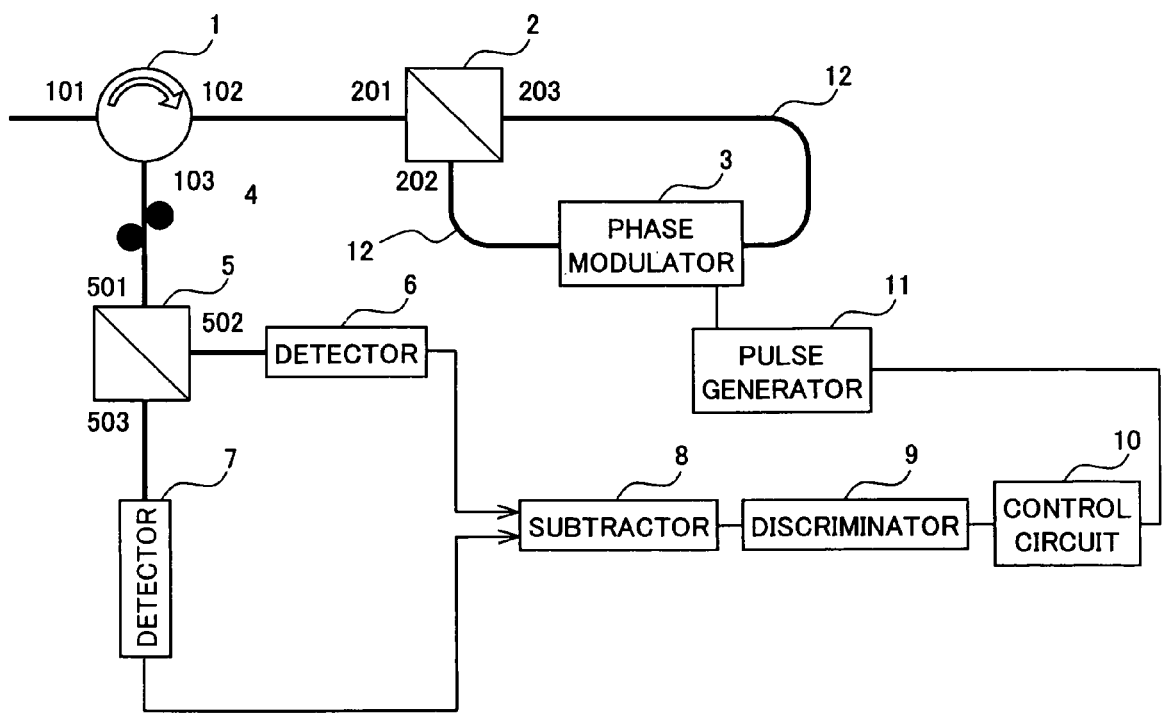
FIG. 2 is a diagram showing a quantum inverse Fourier transform circuit according to an embodiment of the present invention.

FIG. 2 is a diagram showing a quantum inverse Fourier transform circuit according to the embodiment of the present invention.

Figure 1:
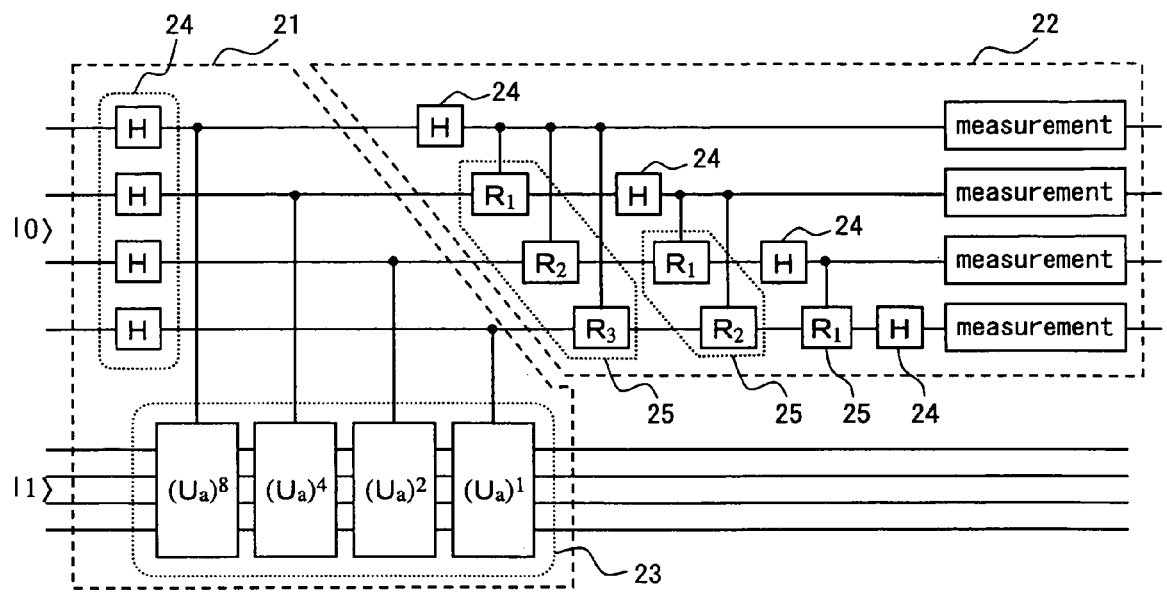
FIG. 1 is a diagram of a circuit in a quantum computer for realizing Shor's algorithm.

In this diagram, a sequence of input light pulses serving as a quantum bit (qubit) string is incident on a terminal 101 of a circulator 1 and is then emitted from a terminal 102. Emitted light is incident on a terminal 201 of a polarization beam splitter 2. The polarization beam splitter 2 splits the light into vertically polarized light to be emitted from a terminal 202 and horizontally polarized light to be emitted from a terminal 203. An output of the terminal 202 is connected to a polarization maintaining fiber segment 12 such that polarization is aligned to the slow axis of the polarization maintaining fiber segment 12. Further, the output is coupled through another polarization maintaining fiber segment 12 to the terminal 203 of the polarization beam splitter 2 via a phase modulator 3. In this instance, the slow axis of the polarization maintaining fiber segment 12 is set so as to obtain horizontal polarization in agreement with the terminal 203. The polarization maintaining fiber segment 12 is longer than the other one connecting the terminal 202 of the polarization beam splitter 2 to the phase modulator 3 by 4 m. Thus, a fiber loop, including the polarization maintaining fiber segments 12, connecting the terminals 202 and 203 can be constructed. In this fiber loop, the vertically polarized light travels clockwise and the horizontally polarized light proceeds counterclockwise. Both the polarizations are again combined into light by the polarization beam splitter 2. The combined light is emitted from the terminal 201 and is then returned to the terminal 102 of the circulator 1. An output is generated from a terminal 103 of the circulator 1. The output from the terminal 103 of the circulator 1 is incident on a terminal 501 of a polarization beam splitter 5 via a polarization controller 4. The polarization controller 4 compensates the difference between polarization states in the fiber segments and the respective components and also acts as the Hadamard gate 24 in FIG. 1. The polarization beam splitter 5 splits incident light into vertically polarized light to be emitted from a terminal 502 and horizontally polarized light to be emitted from a terminal 503. Detectors 6 and 7 are connected to the terminals 502 and 503 of the polarization beam splitter 5, respectively. The difference between outputs of the detectors 6 and 7 is obtained by a subtractor 8. After that, the difference therebetween is supplied to a discriminator 9. An output of the discriminator 9 is supplied to a control circuit 10. The control circuit 10 determines an output voltage of a pulse generator 11. An output of the pulse generator 11 is supplied to the phase modulator 3.

According to the present embodiment, the phase modulator 3 is arranged at a distance of 2 m from the middle point of the fiber loop. The distance D is not limited to this value. The length L of the fiber loop, the repetition time T of the light pulse sequence, the pulse width t of the pulse generator 11 can be determined so as to satisfy the following relationship. When v denotes light velocity in the fiber, $$T > L/v, \quad (7)$$

$$t < D/v \quad (8)$$

Expression (7) denotes a condition to prevent the interference between different qubits in the polarization beam splitter 2. Properly speaking, the condition may not necessarily be satisfied. It is desirable that time during which different pulses collide be longer than the coherence time of light pulses. Expression (8) represents a condition that only one polarized light is subjected to phase modulation.

The structure according to the embodiment has been described in detail above. The control circuit 10 shown in FIG. 2 can include a general shift register or the like. Those skilled in the art can easily construct the control circuit 10 on the basis of the operation, which will be explained below.

Subsequently, each qubit shown in FIG. 2 is represented by the polarization directions of a light pulse. Horizontally polarized light corresponds to the |0> state and vertically polarized light corresponds to the |1> state. Assuming that a phase $\phi$ is expressed in binary decimal notation, i.e., $\phi = 0.\phi_1 \phi_2 \ldots \phi_n$ ($\phi_1, \phi_2, \ldots, \phi_n = 0, 1$), an input state for an inverse Fourier transform can be expressed by $$\frac{1}{2^{n/2}} \sum_{k=0}^{2^n-1} \exp[2\pi i \phi k]|k\rangle = \frac{1}{2^{n/2}} (|0\rangle + e^{2\pi i 0.\phi_n}|1\rangle) \quad (9)$$

$$(|0\rangle + e^{2\pi i 0.\phi_{n-1}\phi_n}|1\rangle) \ldots (|0\rangle + e^{2\pi i 0.\phi_1 \phi_2 \ldots \phi_n}|1\rangle).$$

The polarization states of input light pulses sequentially indicate $|0\rangle + \exp[2\pi i 0.\phi_n]|1\rangle$, $|0\rangle + \exp[2\pi i 0.\phi_{n-1}\phi_n]|1\rangle$, ..., and $|0\rangle + \exp[2\pi i 0.\phi_1 \phi_2 \ldots \phi_n]|1\rangle$. In other words, the polarization is given at a point on the great circle of $y^2 + z^2 = 1$ on the yz plane on the Poincare sphere including 45-degree linear polarization to circular polarization.

A first light pulse passes through the circulator 1 and is then divided into segments in two directions toward the terminals 202 and 203 by the polarization beam splitter 2. The first light pulse is not subjected to phase modulation by the phase modulator 3. After the segments pass through the fiber loop, the polarization state combined by the polarization beam splitter 2 is the same as the input polarization state. After the light pulse passes through the circulator 1, the polarization state is transformed by the polarization controller 4 as shown in Expression (5). In other words, when $\phi_n = 0$, only the detector 7 detects light obtained by polarization split through the polarization beam splitter 5. When $\phi_n = 1$, only the detector 6 detects the light. Therefore, the value of $\phi_n$ can be found by comparing the outputs of the detectors 6 and 7.

Regarding a second light pulse, an output voltage of the pulse generator 11 is adjusted so that the second light pulse is subjected to phase modulation by $-\phi_n \pi/2$. Pulse generation time is set so that when vertically polarized light passes through the phase modulator 3, a pulse is applied to the phase modulator 3, and when horizontally polarized light passes therethrough, a pulse is not applied thereto. According to the present embodiment, the vertically polarized light arrives at the phase modulator 3 earlier than the horizontally polarized light by about 20 ns corresponding to the 4-m fiber. In other words, the vertically polarized light arrives at the phase modulator 3 earlier than the horizontally polarized light by about 20 ns corresponding to a voltage fiber of the pulse generator 11. The width of voltage pulse of the pulse generator 11 is set such that it is shorter than the difference in arrival time between the vertically polarized light and the horizontally polarized light and is longer than the time width of light pulse. According to the present embodiment, the light pulse width is 100 ps and the voltage pulse width of the pulse generator 11 is 10 ns. The respective polarization states pass through the fiber loop and are then combined by the polarization beam splitter 2. The combined polarization state is $|0\rangle + \exp[2\pi i 0.\phi_{n-1}]|1\rangle$. Regarding light passing through the polarization controller 4 and being subjected to polarization split through the polarization beam splitter 5, therefore, when $\phi_{n-1} = 0$, only the detector 7 detects the light. When $\phi_{n-1} = 1$, only the detector 6 detects the light. The outputs of the detectors 6 and 7 are compared to each other, so that the value of $\phi_{n-1}$ can be found.

Regarding a third light pulse, the output voltage of the pulse generator 11 is adjusted so that only the polarization in the |1> state is subjected to phase modulation by $-\phi_{n-1}\pi/2 - \phi_n \pi/4$. Due to the phase modulation, the state of light incident on the polarization beam splitter 5 is $|0\rangle + \exp[2\pi i 0.\phi_{n-2}]|1\rangle$. The outputs of the detectors 6 and 7 are compared to obtain the value of $\phi_{n-2}$.

In a manner similar to the above, the output voltage of the pulse generator 11 is adjusted so that only the polarization in the |1> state of a k-th light pulse is subjected to phase modulation by an amount expressed as follows.

$$-\sum_{j=1}^{k-1} \pi \phi_{n-j+1}/2^{k-j} \quad (10)$$

Due to the phase modulation, light incident on the polarization beam splitter 5 has a state expressed by $|0\rangle + \exp[2\pi i 0.\phi_{n-k+1}]|1\rangle$. The outputs of the detectors 6 and 7 are compared to each other, so that the value of $\phi_{n-k+1}$ can be obtained.

As mentioned above, the operation for performing phase modulation to the next qubit by an amount determined based on a result of the measurement of the preceding input qubit is repeated, so that the inverse Fourier transform can be performed to an arbitrary number of qubits.

According to the present embodiment, the amplitude of phase modulation is determined using the results of all qubits measured so far. The number of photons per pulse is larger than 1 and the difference in output between the detectors 6 and 7 is large. Therefore, if the amount of phase modulation is not accurate, the measurement result includes no error. As a result of the experiment, it was found that the inverse Fourier transform can be performed with accuracy using the measurement results of up to the fourth previous bit.

The quantum circuit described in the present embodiment is combined with a circuit for providing a phase depending on the order, so that Shor's algorithm can be realized. In this case, the number of photons is set larger than 1 in the circuit for providing a phase depending on the order. Therefore, even if an error in phase is large, quantum computation with a small error can be performed.

The present invention is not limited to the foregoing embodiment but many modifications and variations are possible within the spirit of the present invention. The modifications and variations are not excluded from the scope of the present invention.

As described in detail above, the present invention has the following advantages.

(A) First, a controlled-unitary transform can be performed to an arbitrary number of qubits using the controlled-unitary transform for one qubit.

The reason is that the operation of applying phase modulation with an amplitude, determined based on a result of the measurement of a qubit, to the next qubit is repeated.

(B) Second, an error, which is caused by disturbance in the environment and is included in the measurement result, is small.

The reason is as follows: Since a fiber loop is used and polarized light in the |0> state and that in the |1> state propagate through the same fiber, the common disturbance is applied, so that the disturbance does not affect the phase difference between the polarized light in the |0> state and that in the |1> state.

In addition, the number of photons to be used can be increased. Consequently, it is possible to easily distinguish between the |0> state and the |1> state. Thus, even if the phase difference is large, measurement with a small error can be performed.

INDUSTRIAL APPLICABILITY

According to the present invention, the quantum circuit and the quantum computer can realize multi-bit quantum computation. The quantum circuit can be used as one of essential modules of the quantum computer.

The invention claimed is:

1. A quantum circuit comprising:
   means for representing a quantum bit by at least one polarization direction of light;
   means for sequentially supplying a sequence of polarized light pulses representing a quantum bit string to a means for determining an amount of polarization rotation and a phase difference applied to a certain light pulse on the basis of a polarization measurement of a preceding input light pulse sequence, realizing a controlled-unitary transform configured to cause a phase difference between a polarization indicating a |0> state and a polarization indicating a |1> state.

2. The quantum circuit according to claim 1, further comprising:
   means for coupling a plurality of outputs of a polarization beam splitter via a polarization maintaining fiber; and
   a phase modulator arranged in a position deviated from a middle point of the polarization maintaining fiber, thus causing the phase difference between the polarization indicating the |0> state and the polarization indicating the |1> state.

3. The quantum circuit according to claim 2, wherein in the sequence of polarized light pulses representing the quantum bit string, a number of photons included in a single pulse is larger than 1.

4. The quantum circuit according to claim 1, wherein in the sequence of polarized light pulses representing the quantum bit string, a number of photons included in a single pulse is larger than 1.

5. A computer apparatus including a quantum circuit comprising:
   means for representing a quantum bit by at least one polarization direction of light;
   means for sequentially supplying a sequence of polarized light pulses representing a quantum bit string to a means for determining an amount of polarization rotation and a phase difference applied to a certain light pulse on the basis of a polarization measurement of a preceding input light pulse sequence, realizing a controlled-unitary transform configured to cause a phase difference between a polarization indicating a |0> state and a polarization indicating a |1> state.

* * * * *